(12) United States Patent
White et al.

(10) Patent No.: US 10,690,060 B2
(45) Date of Patent: Jun. 23, 2020

(54) TRIPLE BEND FINGER SEAL AND DEFLECTION THEREOF

(71) Applicant: United Technologies Corporation, Farmington, CT (US)

(72) Inventors: Kevin W. White, Jupiter, FL (US); Randall J. Brown, Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 361 days.

(21) Appl. No.: 15/852,439

(22) Filed: Dec. 22, 2017

(65) Prior Publication Data

US 2019/0195136 A1    Jun. 27, 2019

(51) Int. Cl.
*F02C 7/28* (2006.01)
*F01D 9/02* (2006.01)
*F01D 11/00* (2006.01)

(52) U.S. Cl.
CPC ............... *F02C 7/28* (2013.01); *F01D 9/023* (2013.01); *F01D 11/00* (2013.01); *F01D 11/003* (2013.01); *F01D 11/005* (2013.01); *F05D 2220/32* (2013.01); *F05D 2240/35* (2013.01); *F05D 2240/55* (2013.01); *F05D 2260/30* (2013.01)

(58) Field of Classification Search
CPC ........ F01D 9/023; F01D 11/00; F01D 11/003; F01D 11/005; F02C 7/28; F05D 2240/55; F05D 2240/57; F05D 2260/30; F23R 2900/00012
See application file for complete search history.

(56) References Cited

U.S. PATENT DOCUMENTS

| | | | |
|---|---|---|---|
| 4,821,522 A * | 4/1989 | Matthews | F01D 9/023 415/175 |
| 9,366,444 B2 | 6/2016 | Salunkhe et al. | |
| 2004/0036230 A1* | 2/2004 | Matsuda | F01D 9/023 277/632 |
| 2013/0270777 A1* | 10/2013 | Clouse | F16J 15/0887 277/637 |
| 2015/0128610 A1* | 5/2015 | Salunkhe | F01D 9/023 60/800 |
| 2015/0292344 A1 | 10/2015 | Chuong et al. | |
| 2015/0354384 A1 | 12/2015 | Budnick | |
| 2015/0354386 A1 | 12/2015 | Chuong et al. | |
| 2016/0326897 A1 | 11/2016 | Feldmann et al. | |
| 2017/0292704 A1 | 10/2017 | Sander et al. | |

OTHER PUBLICATIONS

EP search report for EP18212791.0 dated May 29, 2019.

\* cited by examiner

*Primary Examiner* — Ehud Gartenberg
*Assistant Examiner* — David P. Olynick
(74) *Attorney, Agent, or Firm* — Getz Balich LLC (57) ABSTRACT

A finger seal for a gas turbine engine is disclosed. The finger seal includes a first leg, a second leg, a third leg, a fourth leg, a first bend segment disposed between the first leg and the second leg, a second bend segment disposed between the second leg and the third leg, and a third bend segment disposed between the third leg and the fourth leg. The third bend segment is radially outward of the first bend segment relative to an axial centerline of the gas turbine engine.

14 Claims, 7 Drawing Sheets

TRIPLE BEND FINGER SEAL AND DEFLECTION THEREOF

BACKGROUND

Engines, such as those which power aircraft and industrial equipment, may employ a compressor to compress air that is drawn into the engine and a turbine to capture energy associated with a combustion of a fuel-air mixture. Seals are used in engines to isolate a fluid from one or more areas/ regions of the engine. For example, seals control various parameters (e.g., temperature, pressure) within the engine and ensure proper/efficient engine operation and stability.

A metallic finger seal that includes overlapping sheet metal segments is a known type of seal. For example, U.S. patent application publication number 2015/0354384 (hereinafter the '384 publication) describes/illustrates embodiments of an engine incorporating a finger seal. The contents of the '384 publication are incorporated herein by reference.

It can be difficult to provide adequate sealing using, e.g., a finger seal over the operational range of an engine due to a variety of factors. Such factors include irregular/odd-shaped component profiles, component tolerances, nominal/normal component deflections (e.g., relative motion between components), and large magnitude deflections (e.g., deflections resulting from increased/maximum maneuvers). Design options for a seal may be limited in some instances. For example, in terms of accommodating legacy/existing engine hardware, design options may be limited due to pre-existing constraints.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a gas turbine engine having an axial centerline, comprising: a combustor section, a turbine section that includes a vane, a duct coupled to the combustor section and the turbine section, and a finger seal coupled to the duct and the vane, the finger seal including a first leg, a second leg, a third leg, a fourth leg, a first bend segment disposed between the first leg and the second leg, a second bend segment disposed between the second leg and the third leg, and a third bend segment disposed between the third leg and the fourth leg, wherein the first bend segment is located radially outward of the first leg relative to the axial centerline, wherein the second bend segment is located radially inward of the second leg and the third leg relative to the axial centerline, wherein the third bend segment is located radially outward of the third leg and the fourth leg relative to the axial centerline, and wherein the third bend segment is located radially outward of the first bend segment relative to the axial centerline. In some embodiments, the second leg is oriented radially inward in terms of a progression of the second leg from the first bend segment to the second bend segment. In some embodiments, the first bend segment defines an angle between the second leg and a radial outward reference direction that is greater than ninety degrees and less than one-hundred eighty degrees. In some embodiments, the third leg is oriented radially outward in terms of a progression of the third leg from the second bend segment to the third bend segment. In some embodiments, the second bend segment defines an angle between the third leg and a radial outward reference direction that is less than ninety degrees. In some embodiments, the fourth leg is oriented radially inward in terms of a progression of the fourth leg away from the third bend segment. In some embodiments, the third bend segment defines an angle between the fourth leg and a radial outward reference direction that is greater than ninety degrees and less than one-hundred eighty degrees. In some embodiments, the gas turbine engine further comprises a fastener that couples the first leg and a flange of the vane. In some embodiments, the gas turbine engine further comprises a spring coupled to the fastener and the flange. In some embodiments, the fastener includes a bolt and a nut. In some embodiments, the first leg is oriented substantially radially relative to the axial centerline.

Aspects of the disclosure are directed to a finger seal for a gas turbine engine comprising: a first leg, a second leg, a third leg, a fourth leg, a first bend segment disposed between the first leg and the second leg, a second bend segment disposed between the second leg and the third leg, and a third bend segment disposed between the third leg and the fourth leg, wherein the third bend segment is radially outward of the first bend segment relative to an axial centerline of the gas turbine engine, in some embodiments, the first bend segment defines a first angle of less than ninety degrees between the first leg and the second leg, the first angle defined radially inward of the first bend segment relative to the axial centerline. In some embodiments, the second bend segment defines a second angle greater than ninety degrees and less than one-hundred eighty degrees between the second leg and the third leg, the second angle defined radially outward of the second bend segment relative to the axial centerline. In some embodiments, the third bend segment defines a third angle greater than ninety degrees and less than one-hundred eighty degrees between the third leg and the fourth leg, the third angle defined radially inward of the third bend segment relative to the axial centerline

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems, and methods are described for applying a load to one or more bearings. In some embodiments, the load that is applied may help to reduce the likelihood of, or even prevent, a skid condition from occurring with respect to a bearing of an engine. In some embodiments, a bearing may be offset relative to a shaft or one or more additional bearings in order to obtain the load.

Figure 1:
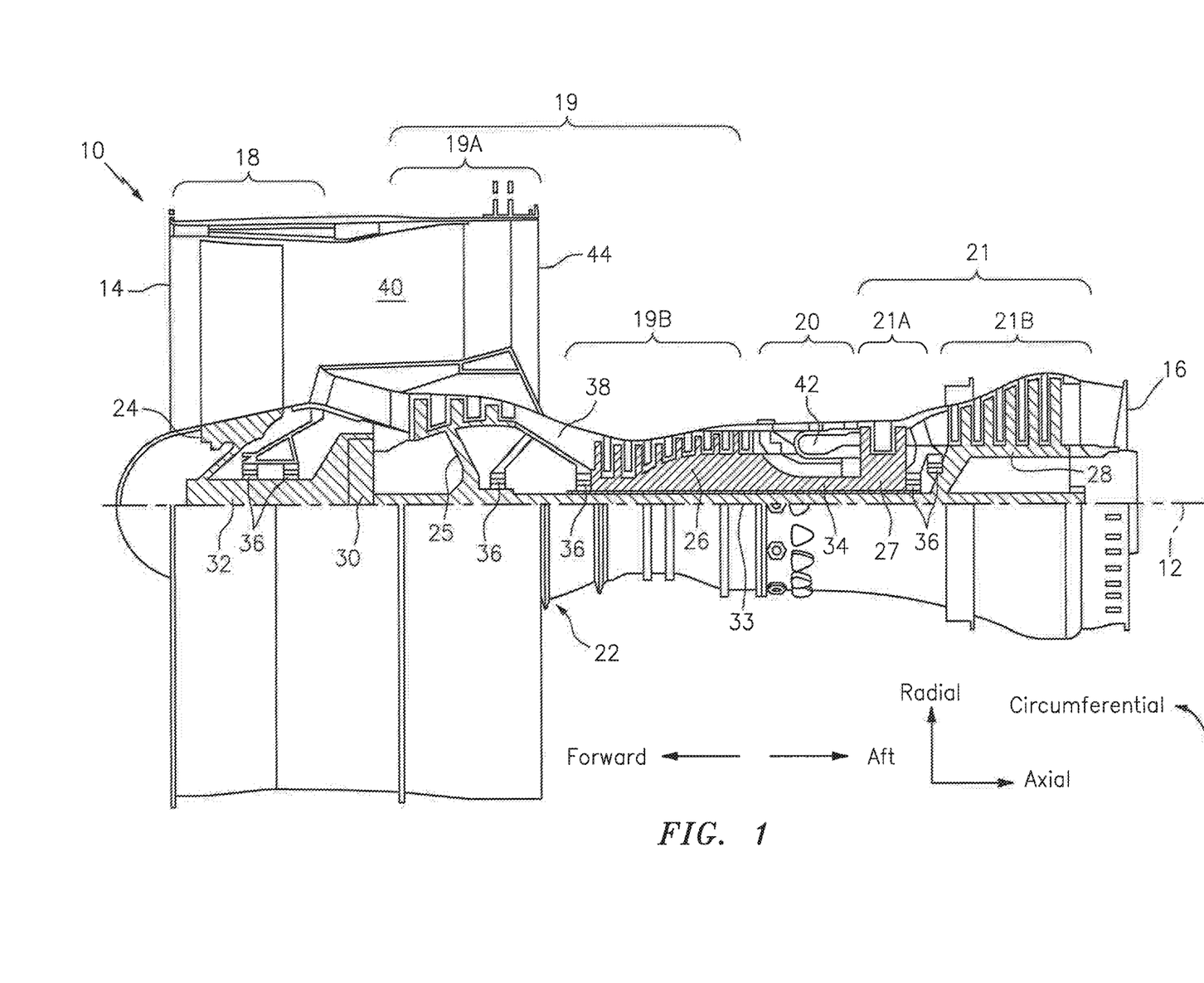
FIG. 1 is a side cutaway illustration of a gas turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36 (e.g., rolling element and/or thrust bearings). Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 1A:
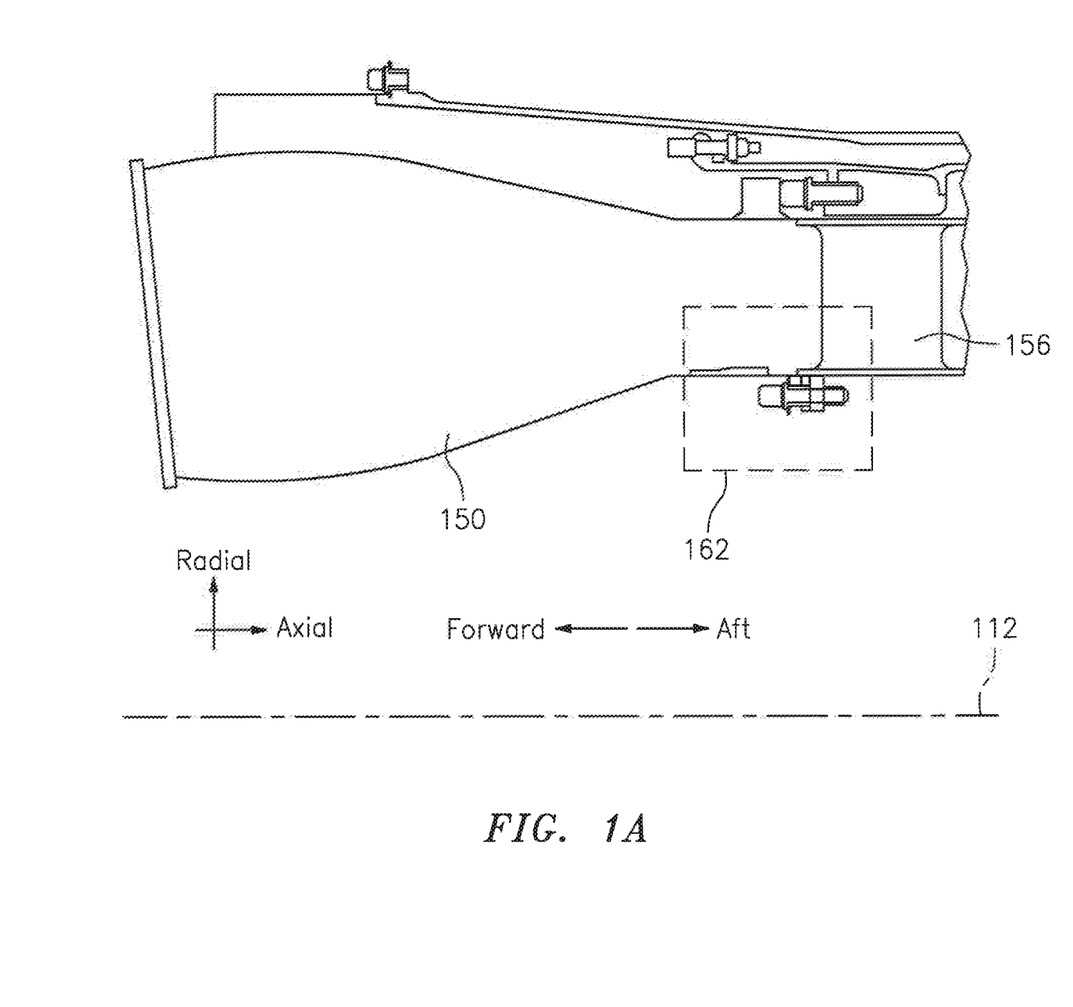
FIG. 1A illustrates a portion of an engine that includes a duct and a vane in accordance with aspects of this disclosure.

FIG. 1A illustrates a portion of an engine (e.g., the engine 10 of FIG. 1). In particular, FIG. 1A illustrates a duct 150 in relation to a vane 156. Also, for reference purposes, an engine/axial centerline 112 is shown in FIG. 1A; the centerline 112 may correspond to the centerline 12 of FIG. 1.

The duct 150 may be a transition duct between a combustor/combustor section (e.g., the combustor section 20 of FIG. 1) and a turbine/turbine section (e.g., the turbine section 21 of FIG. 1). The vane 156 may be a vane of the turbine section 21 (e.g., the HPT section 21A) of FIG. 1. At an interface 162 between the duct 150 and the vane 156, sealing may be provided. A closer view of the interface 162, and sealing associated therewith, is shown in FIG. 2.

Figure 2:
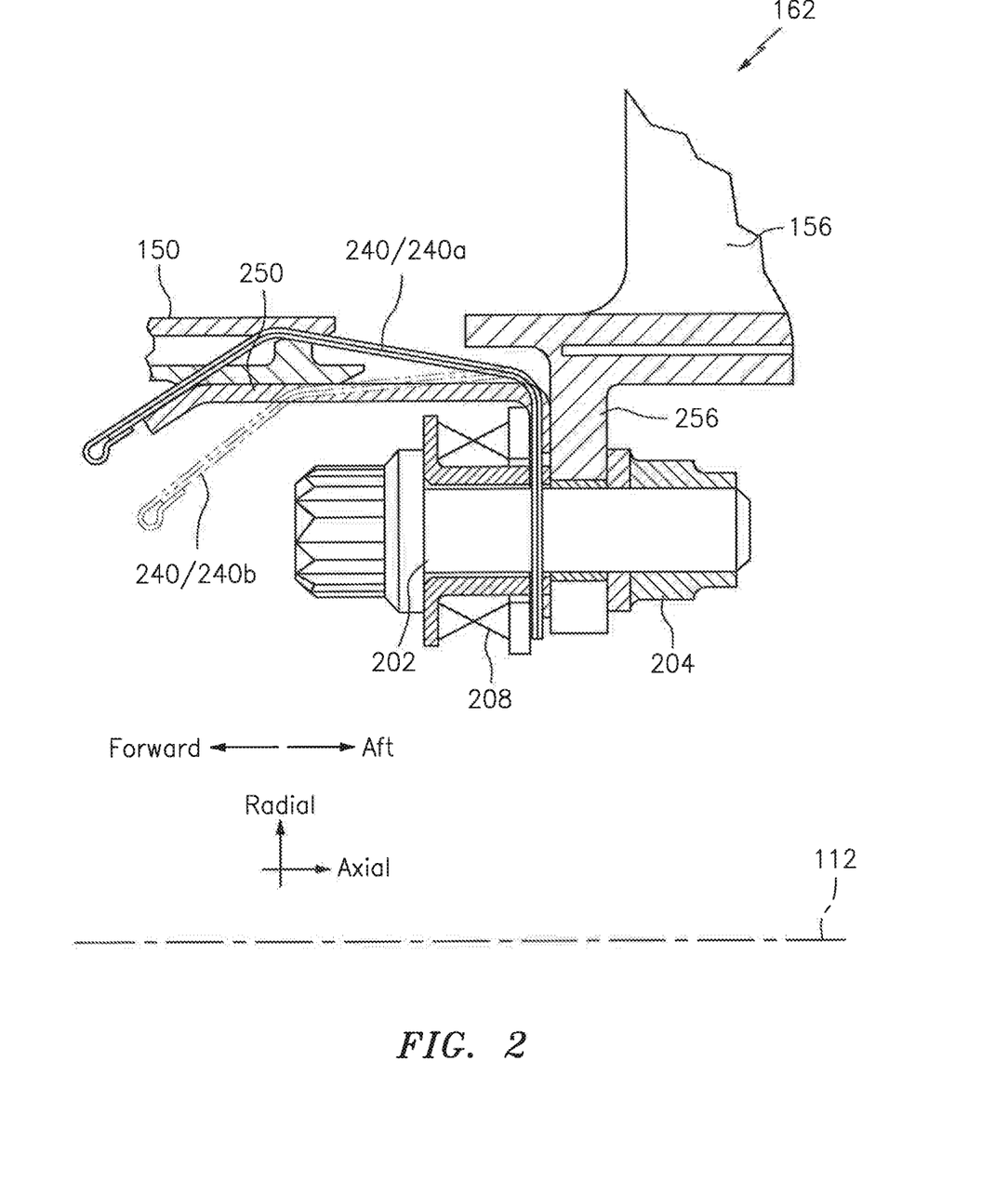
FIG. 2 illustrates an interface of the portion of the engine of FIG. 1A, where the interface incorporates a sealing arrangement.

As shown in FIG. 2, the duct 150 may be coupled to the vane 156. A fastener (e.g., a bolt 202/nut 204 combination) may be used to couple a flange 256 of the vane 156 and a spring 208 (also referred to herein as a soft-spring mount system). The spring 208 may be used to accommodate differential thermal growth between, e.g., the duct 150 and the vane 156.

A finger seal 240 may be used to provide sealing. In FIG. 2, the finger seal 240 is shown in a first/free state/condition 240a as the finger seal 240 would exist prior to installation. The finger seal 240 is also shown in a second/compressed state/condition 240b as the finger seal 240 would exist following installation.

For completeness, a belly band seal 250 is shown in FIG. 2. The finger seal 240 and the belly band seal 250 may be used as alternatives to one another in some embodiments. Stated differently, some embodiments might not include both the belly band seal 250 and the finger seal 240.

The arrangement shown in FIG. 2 may be difficult to implement in various application environments. For example, in terms of relative deflection between the duct 150 and the vane 156, there may be insufficient space/clearance between the finger seal 240 and the vane 156/flange 256, such that under a worst-case (e.g., maximum) deflection condition scenario the vane 156/flange 256 may abut (and potentially even crush) the finger seal 240. Also, due to limited space (e.g., a radial clearance between the duct 150 and the spring 208 being less than a threshold) it may be difficult to install the finger seal 240 during assembly; in some instances, the finger seal 240 may even be crushed during assembly. In some instances, the finger seal 240 may be installed at/proximate the (aft-most) edge of the duct 150, which may result in premature finger seal 240 fatigue (e.g., seal wear).

Figure 3:
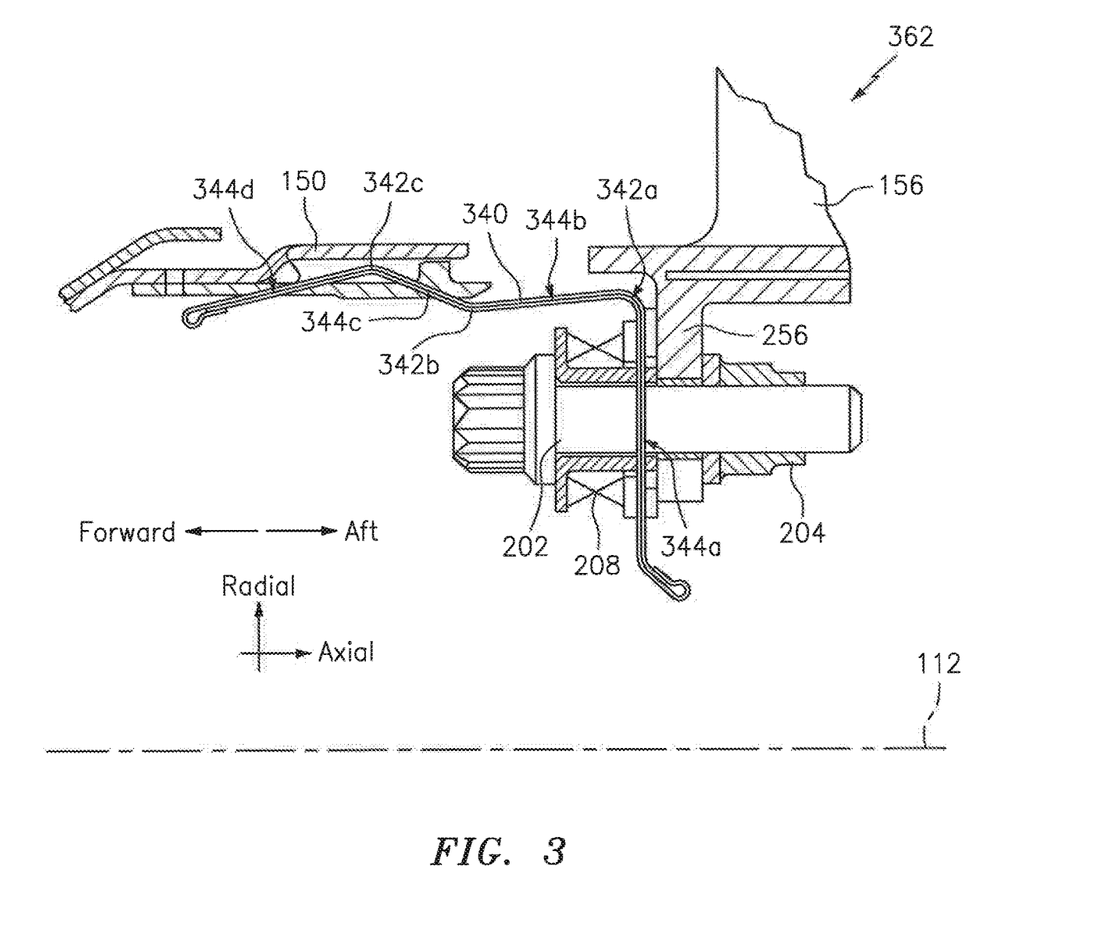
FIG. 3 illustrates an interface of the portion of the engine of FIG. 1A, where the interface incorporates a second sealing arrangement.

FIG. 3 illustrates an interface 362 between the duct 150 and the vane 156 that incorporates a finger seal 340 in accordance with aspects of this disclosure. The interface 362 may correspond to the interface 162 shown in FIGS. 1A and 2. Stated differently, the finger seal 340 may be used as a substitute/replacement for the finger seal 240 (and/or the belly band seal 250) of FIG. 2 in some embodiments.

The finger seal 340 may be referred to as a triple bend finger seal. For example, the finger seal 340 may include three bends/bend segments as represented by a first bend 342a, a second bend 342b, and a third bend 342c, The finger seal 340 may include legs that may be at least partially defined relative to the bends 342a-342c. For example, the finger seal 340 may include a first leg 344a, a second leg 344b, a third leg 344c, and a fourth leg 344d, where each of the legs 344a-344d may be separated from the next (sequential) leg by one of the bends 342a-342c as shown in FIG. 3.

The first leg 344a may be oriented substantially radially (e.g., radially plus or minus five degrees) as shown in FIG. 3. The first leg 344a may be held in mated assembly with, the flange 256 via the fastener (e.g., bolt 202 and nut 204).

Figure 3A:
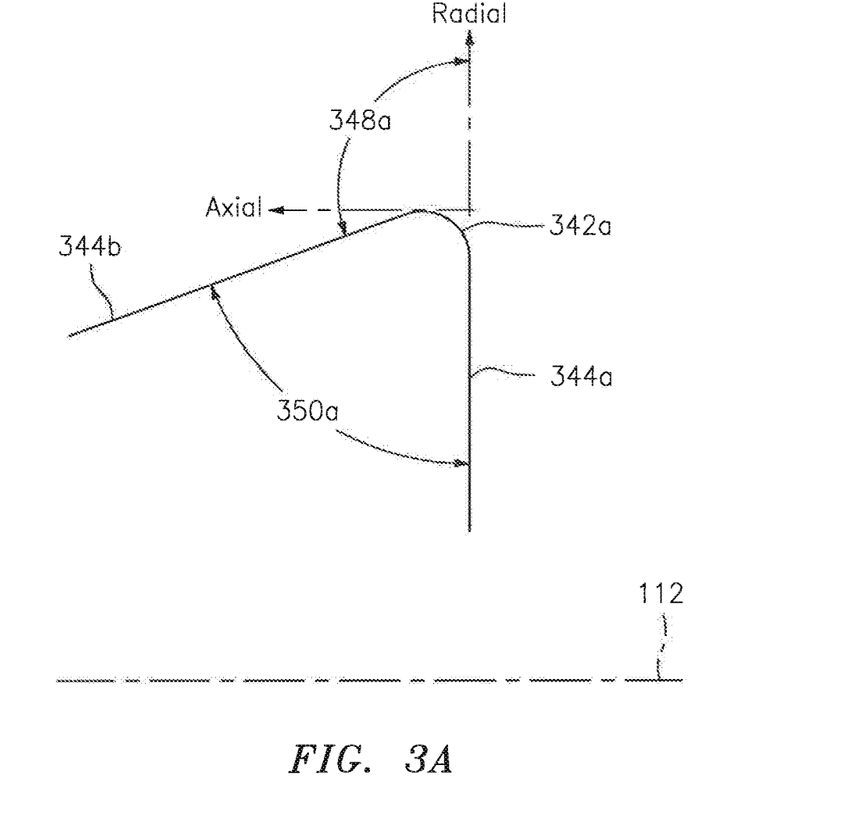
FIGS. 3A-3C illustrate parameters associated with the sealing arrangement of FIG. 3.

The first bend 342a may be located radially outward/outboard of the first leg 344a (where radially outward refers to a direction that is away from the centerline 112). The first bend 342a may be disposed between the first leg 344a and the second leg 344b. The second leg 344b may be oriented radially inward/inboard (and axially forward) in terms of a transition/progression of the second leg 344b from the first bend 342a to the second bend 342b (where radially inward refers to a direction that is towards the centerline 112). Referring to FIGS. 3 and 3A, relative to the radial outward reference direction the first bend 342a may be oriented at/provide an angle 348a of greater than ninety degrees and less than one-hundred eighty degrees between the second leg 344b and that reference direction; analogously, the first bend 342a may define an angle 350a between the first leg 344a and the second leg 344b that is less than ninety degrees (where the angle 350a is defined radially inward of the first bend 342a). The angle 348a being greater than ninety degrees and less than one-hundred eighty degrees may increase a preload that is applied to the finger seal 340 (relative to a scenario where the angle 348a is equal to ninety degrees). The angle 348a being greater than ninety degrees (and less than one-hundred eighty degrees) may increase a clearance between the finger seal 340 (e.g., the second leg 344b) and the vane 156 (relative to a scenario where the angle 348a is equal to ninety degrees).

Figure 3B:
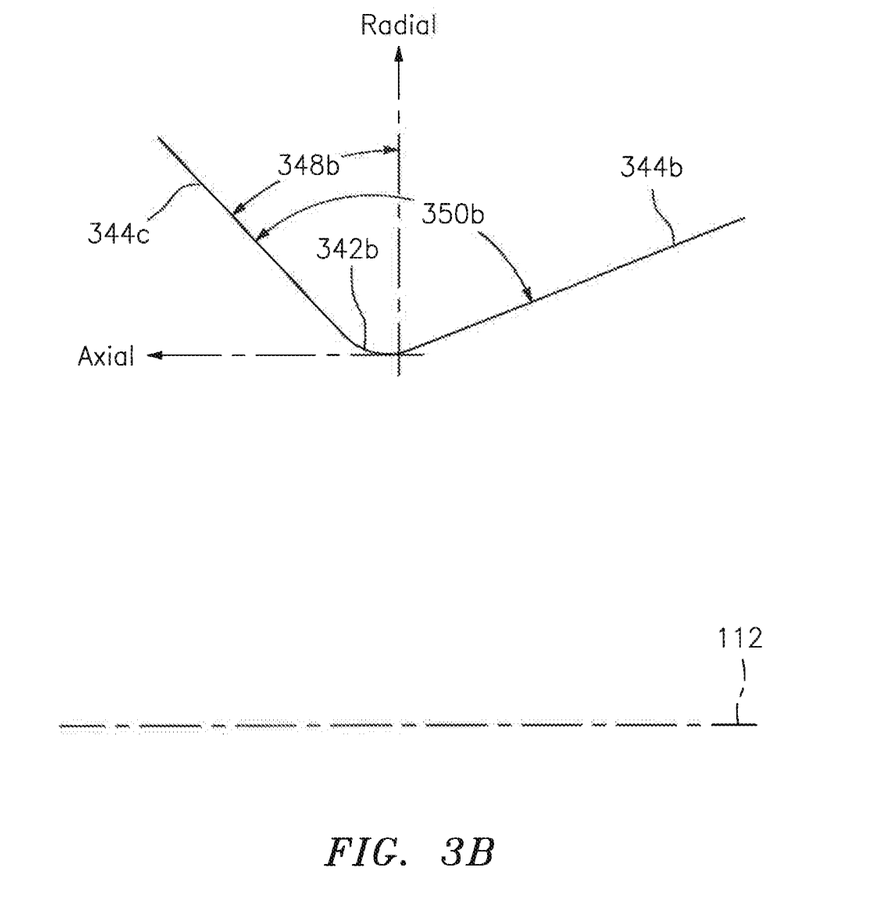

Referring to FIG. 3, the second bend 342b may be disposed between the second leg 344b and the third leg 344c. The second bend 342b may be located radially inward of the second leg 344b and the third leg 344c. The third leg 344c may be oriented radially outward (and axially forward) in terms of a transition/progression of the third leg 344c from the second bend 342b to the third bend 342c. Referring to FIGS. 3 and 3B, relative to the radial outward reference direction the second bend 342b may be oriented at/provide an angle 348h of less than ninety degrees between the third leg 344c and that reference direction; analogously, the second bend 342h may define an angle 350h between the second leg 344b and the third leg 344c that is greater than ninety degrees and less than one-hundred eighty degrees (where the angle 350b is defined radially outward of the second bend 342b). The angle 348h being less than ninety degrees may help to provide/increase stiffness to/support of the duct 150 at the location of third bend 342c.

Figure 3C:
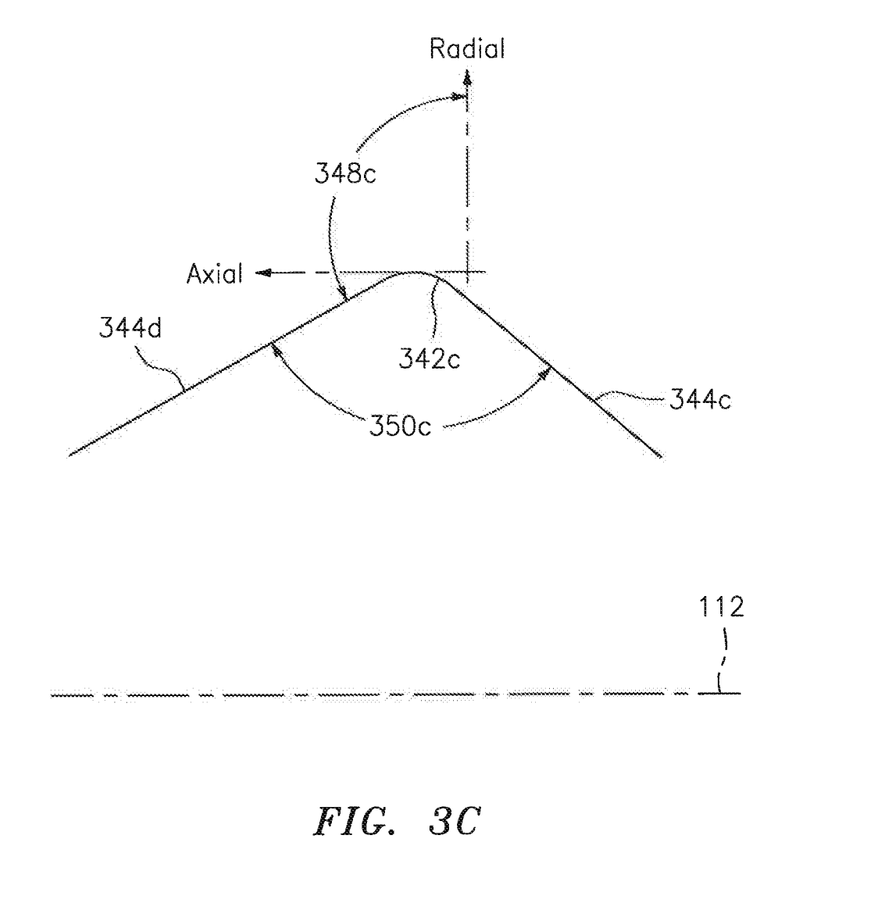

Referring to FIG. 3, the third bend 342c may be disposed between the third leg 344c and the fourth leg 344d. The third bend 342c may be located radially outward of the third leg 344c and the fourth leg 344d. The fourth leg 344d may be oriented radially inward (and axially forward) in terms of a transition/progression of the fourth leg 344d away from the third bend 342c. Referring to FIGS. 3 and 3C, relative to the radial outward reference direction the third bend 342c may be oriented at/provide an angle 348c greater than ninety degrees and less than one-hundred eighty degrees between the fourth leg 344d and that reference direction; analogously, the third bend 342c may define an angle 350c between the third leg 344c and the fourth lea 344d that is greater than ninety degrees and less than one-hundred eighty degrees (where the angle 350c is defined radially inward of the third bend 342c), The angle 348c being greater than ninety degrees may be used to provide an adequate preload (e.g., a preload in an amount greater than a threshold) to the finger seal 340 and may help to reduce load imparted on the finger seal 340 during engine operation. The fourth leg 344d and the angle 348c being greater than ninety degrees may facilitate installation of the finger seal 340, as the ramped shape of the fourth leg 344d may serve as a lead-in/guide feature in terms of positioning the finger seal 340 relative to, e.g., the duct 150 and/or the vane 156.

The various features of the finger seal 340 (e.g., one or more of the bends 342a-342c, the legs 344a-344d, and the angles 348a-348c [or analogously, the angles 350a-350c]) may: accommodate sealing where space is limited, facilitate ease in installation/assembly (despite variations in terms of, e.g., component tolerances), and reduce (e.g., eliminate) wear being imposed on the finger seal 340 (or any counterpart mate faces). The features of the finger seal 340 may help to avoid the second leg 344b or first bend 342a from contacting the vane 156 or the spring 208, which may help to avoid crushing the finger seal 340 (or a portion thereof) during assembly and/or engine operation. The features of the finger seal 340 may provide for an increased range of deflection of, e.g., the duct 150 relative to the vane 156 in comparison to conventional seals.

Aspects of the disclosure have been described in terms of illustrative embodiments thereof, Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A gas turbine engine having an axial centerline, comprising:
   a combustor section;
   a turbine section that includes a vane;
   a duct coupled to the combustor section and the turbine section; and
   a finger seal coupled to the duct and the vane, the finger seal including
      a first leg;
      a second leg;
      a third leg; a fourth leg;
      a first bend segment disposed between the first leg and the second leg;
      a second bend segment disposed between the second leg and the third leg; and
      a third bend segment disposed between the third leg and the fourth leg,
   wherein the first bend segment is located radially outward of the first leg relative to the axial centerline,
   wherein the second bend segment is located radially inward of the second leg and the third leg relative to the axial centerline, wherein the third bend segment is located radially outward of the third leg and the fourth leg relative to the axial centerline, wherein the third bend segment is located radially outward of the first bend segment relative to the axial centerline, and wherein the second bend segment defines a first angle greater than ninety degrees and less than one-hundred eighty degrees between the second leg and the third leg, the first angle defined radially outward of the second bend segment relative to the axial centerline.

2. The gas turbine engine of claim 1, wherein the second leg is oriented radially inward in terms of a progression of the second leg from the first bend segment to the second bend segment.

3. The gas turbine engine of claim 1, wherein the first bend segment defines an angle between the second leg and a radial outward reference direction that is greater than ninety degrees and less than one-hundred eighty degrees.

4. The gas turbine engine of claim 1, wherein the third leg is oriented radially outward in terms of a progression of the third leg from the second bend segment to the third bend segment.

5. The gas turbine engine of claim 1, wherein the second bend segment defines an angle between the third leg and a radial outward reference direction that is less than ninety degrees.

6. The gas turbine engine of claim 1, wherein the fourth leg is oriented radially inward in terms of a progression of the fourth leg away from the third bend segment.

7. The gas turbine engine of claim 1, wherein the third bend segment defines an angle between the fourth leg and a radial outward reference direction that is greater than ninety degrees and less than one-hundred eighty degrees.

8. The gas turbine engine of claim 1, further comprising: a fastener that couples the first leg and a flange of the vane.

9. The gas turbine engine of claim 8, further comprising: a spring coupled to the fastener and the flange.

10. The gas turbine engine of claim 8, wherein the fastener includes a bolt and a nut.

11. The gas turbine engine of claim 1, wherein the first leg is oriented substantially radially relative to the axial centerline.

12. A finger seal for a gas turbine engine comprising:
a first leg;
a second leg;
a third leg;
a fourth leg;
a first bend segment disposed between the first leg and the second leg;
a second bend segment disposed between the second leg and the third leg; and
a third bend segment disposed between the third leg and the fourth leg,
wherein the third bend segment is radially outward of the first bend segment relative to an axial centerline of the gas turbine engine and,
wherein the second bend segment defines a first angle greater than ninety degrees and less than one-hundred eighty degrees between the second leg and the third leg, the first angle defined radially outward of the second bend segment relative to the axial centerline.

13. The finger seal of claim 12, wherein the first bend segment defines a second angle of less than ninety degrees between the first leg and the second leg, the second angle defined radially inward of the first bend segment relative to the axial centerline.

14. The finger seal of claim 12, wherein the third bend segment defines a third angle greater than ninety degrees and less than one-hundred eighty degrees between the third leg and the fourth leg, the third angle defined radially inward of the third bend segment relative to the axial centerline.

* * * * *